(12) United States Patent
Rattapon et al.

(10) Patent No.: US 7,373,230 B2
(45) Date of Patent: May 13, 2008

(54) STEERING ASSIST APPARATUS AND METHOD FOR VEHICLE

(75) Inventors: Chumsamutr Rattapon, Susono (JP); Seiji Kawakami, Susono (JP); Satoru Niwa, Susono (JP); Katsuhiko Iwazaki, Numazu (JP); Hiroaki Kataoka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 267 days.

(21) Appl. No.: 11/138,432

(22) Filed: May 27, 2005

(65) Prior Publication Data

US 2005/0273234 A1 Dec. 8, 2005

(30) Foreign Application Priority Data

Jun. 2, 2004 (JP) ............................. 2004-164995

(51) Int. Cl.
*B62D 6/04* (2006.01)
(52) U.S. Cl. .......................................... 701/41; 180/443
(58) Field of Classification Search .................. None
See application file for complete search history.

(56) References Cited

U.S. PATENT DOCUMENTS

| | | | |
|---|---|---|---|
| 4,875,540 A | 10/1989 | Oshita et al. | |
| 5,268,841 A | 12/1993 | Mouri | |
| 5,749,431 A | 5/1998 | Peterson | |
| 5,765,116 A | 6/1998 | Wilson-Jones et al. | |
| 6,212,453 B1* | 4/2001 | Kawagoe et al. | 701/41 |
| 6,256,561 B1* | 7/2001 | Asanuma | 701/41 |
| 6,493,619 B2* | 12/2002 | Kawazoe et al. | 701/41 |
| 6,580,986 B1* | 6/2003 | Uenuma et al. | 701/41 |
| 2003/0078712 A1 | 4/2003 | Shimakage et al. | |
| 2005/0256620 A1* | 11/2005 | Kato et al. | 701/41 |

FOREIGN PATENT DOCUMENTS

| | | |
|---|---|---|
| EP | 1 170 651 A2 | 1/2002 |
| JP | A-11-147473 | 6/1999 |
| JP | A-2001-010518 | 1/2001 |
| JP | 2003-137119 * | 5/2003 |
| JP | A-2004-017898 | 1/2004 |
| WO | WO2004/012977 * | 2/2004 |

* cited by examiner

*Primary Examiner*—Michael J. Zanelli
(74) *Attorney, Agent, or Firm*—Oliff & Berridge, PLC

(57) ABSTRACT

Characteristic lines A to D of lateral acceleration G-required torque T in determination of required torque T are used as switched according to increase/decrease of the absolute value of the lateral acceleration, and the direction thereof. The lines A, C used in increase of the absolute value of the lateral acceleration G are so set that the absolute value of required torque T becomes larger at the same lateral acceleration G (G≠0) than that with the lines B, D used in decrease of the absolute value of the lateral acceleration G. The difference between line A and line B (the difference between line C and line D as well) at the same lateral acceleration G is so set that the difference near the lateral acceleration of 0 is smaller than that in the other regions. Particularly, it is preferable to set the required torque T to 0 at the lateral acceleration G of 0.

9 Claims, 10 Drawing Sheets

(a)

(b)

(c)

STEERING ASSIST APPARATUS AND METHOD FOR VEHICLE

BACKGROUND OF THE INVENTION

1. Technical Field

The present invention relates to a steering assist apparatus and method for vehicle arranged to apply an appropriate steering assist torque, in order to assist driving along a driving lane.

2. Background Art

The steering assist apparatus for a vehicle so as to assist driving of the vehicle along a driving lane has disclosed (e.g., JP A 2001-10518). This assist apparatus first acquires an image of a lane on which the host vehicle is running with a CCD camera or the like. Boundary lines to zone the driving lane are detected by image recognition process from the acquired image to acquire driving lane information which the host vehicle must be running. A steering torque necessary for steering to maintain the driving along the lane is determined based on the acquired driving lane information, and an appropriate steering assist torque is applied so as to assist driver's steering.

SUMMARY OF THE INVENTION

The above-mentioned conventional technology describes that the appropriate assist torque can be calculated by calculating the steering assist torque from a curvature of the driving lane, a lane offset being a lateral deviation amount between the center line of the vehicle and the center line of the driving lane, and a derivative value of a deflection angle being an angle between the center line of the driving lane and the center line of the vehicle.

Incidentally, the steering system is constricted in such a configuration that the steering wheel is connected through a gear box, suspension joints, etc. to wheels, and there exists resistance due to friction thereof (steering friction). In increasing the steering amount, this steering friction acts as resistance to output of a motor for applying the assist torque to cause shortage of steering torque. On the other hand, in decreasing the steering amount, this steering friction acts as resistance to a returning force of the wheels to the straight direction, and thus functions in the same manner as in the case where the output of the motor to apply the steering torque acts excessively. For this reason, there is a problem that the assist torque is not applied according to the target assist torque, so as to degrade controllability.

An object of the present invention is therefore to provide a steering assist apparatus and method for vehicle enabling application of the assist torque consistent with a target lateral acceleration.

In order to achieve the above object, a steering assist apparatus or method for vehicle according to the present invention is an apparatus or method for vehicle which determines a target lateral acceleration of a vehicle for assist operation and applies an assist steering force for assisting a driver's steering force in response to the target lateral acceleration thus determined, wherein an assist torque to be applied at an arbitrary target lateral acceleration is so set that the assist torque in an increasing state of the target lateral acceleration is larger than the assist torque in a decreasing state of the target lateral acceleration, and wherein a difference between the assist torque applied in the decreasing state of the target lateral acceleration and the assist torque applied in the increasing state of the target lateral acceleration in a region near the target lateral acceleration of 0 is set smaller than in the other case.

The assist torque in the case of increasing the absolute value of the target lateral acceleration, i.e., in the forward steering operation of increasing the steering amount is set larger than the assist torque in the case of decreasing the absolute value of the target lateral acceleration, i.e., in the backward steering operation of decreasing the steering amount, whereby the assist torque in accordance with the target lateral acceleration is applied. For example, it is preferable to take the steering friction into consideration; in the forward steering operation, the assist torque larger by the amplitude of the steering friction is applied than in the case without consideration to the steering friction; in the backward steering operation, the assist torque smaller by the amplitude of the steering friction is applied than in the case without consideration to the steering friction. In the region near the target lateral acceleration of 0, the difference between the applied assist torques is set smaller, whereby the assist torque amount is prevented from quickly varying in the case where the steering wheel is turned back from a turned state in a certain direction (e.g., the right direction) to make a transition to near the steering amount of 0 and where the steering wheel is again steered forward in the same direction (the right direction).

The difference between the assist torque applied in the decreasing state of the target lateral acceleration and the assist torque applied in the increasing state of the target lateral acceleration is preferably set to be 0 at the target lateral acceleration of 0. This makes the variation of the assist torque amount approximately equal to 0 in the aforementioned case of backward steering and subsequent forward steering in the same direction.

It can be well determined that a switch of an increase or decrease direction is made, on the basis of a transition of time change of the target lateral acceleration if an identical tendency of increase or decrease further continues after a switch of the target lateral acceleration from decrease to increase or from increase to decrease. Namely, the switch between the assist torque characteristic in the increasing direction and the assist torque characteristic in the decreasing direction is not instantaneously performed at a point of the switch of increase or decrease of the target lateral acceleration, but is executed if the increasing tendency or decreasing tendency continues after the switch of increase or decrease. The continuation of the increasing tendency or decreasing tendency can be determined, for example, where the increasing/decreasing tendency continues over a predetermined period of time or where the target lateral acceleration increases or decreases over a predetermined amount after the switch.

Since the present invention involves applying the steering assist torque in consideration of the amplitude of steering friction of the steering system, the assist torque consistent with the target lateral acceleration can be applied in both of the forward steering operation and the backward steering operation, whereby the appropriate steering assist torque can be applied. For this reason, operability of steering is improved and degradation of the operation feeling can be suppressed.

By making the difference small between the assist torque amounts near the neutral state of steering, it is feasible to further improve the steering operability and to further suppress the degradation of the operation feeling, without sudden change of the assist torque upon a switch of the steering direction. Particularly, this effect of suppressing the sudden change becomes more significant when the assist torque difference in the neutral state of steering is 0.

By preventing frequent occurrence of the switch of the increase or decrease direction, the assist torque is prevented from changing in a vibrating manner and the degradation of the steering feeling is suppressed even in the case where the target lateral acceleration as a target of control is repetitively reversed in a short period of time, different from the case where the increase/decrease direction of the assist torque control is switched every time of reverse.

DESCRIPTION OF THE PREFERRED EMBODIMENT OF THE INVENTION

Figure 1:
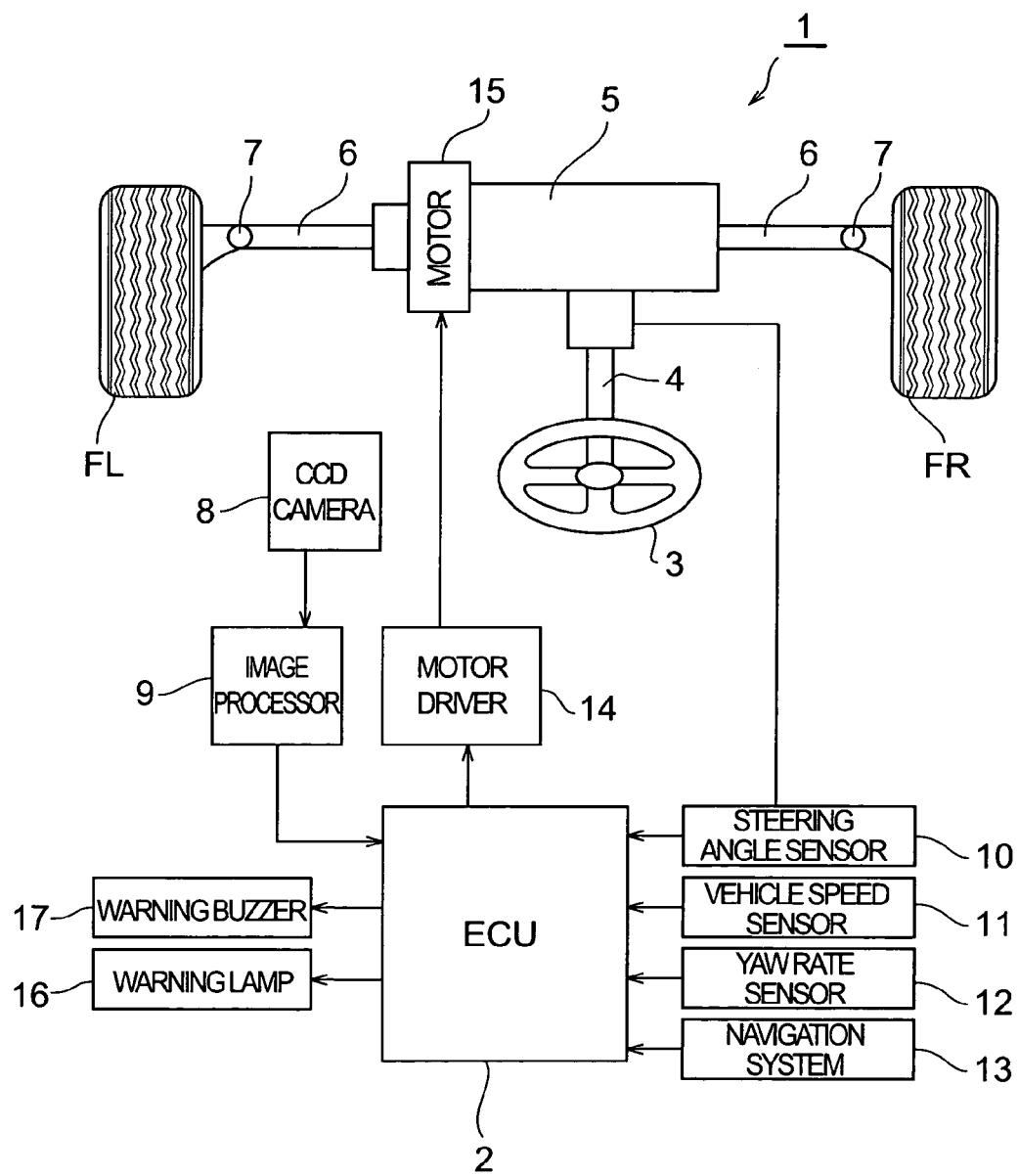
FIG. 1 is a configuration diagram of a vehicle 1 with a steering assist apparatus for vehicle according to an embodiment of the present invention.

The preferred embodiment of the present invention will be described below in detail with reference to the accompanying drawings. To facilitate the comprehension of the explanation, the same reference numerals denote the same parts, where possible, throughout the drawings, and a repeated explanation will be omitted.

An embodiment of the steering assist apparatus for vehicle according to the present invention will be described below. FIG. 1 is a configuration diagram of vehicle 1 with the steering assist apparatus for vehicle of the present embodiment. The vehicle 1 is provided with an Electrical Control Unit (ECU) 2, and the ECU 2 executes a vehicle behavior control (lane keep control). As shown in FIG. 1, the vehicle 1 is equipped with a steering wheel 3. The steering wheel 3 is provided in the interior of the vehicle 1, and is manipulated by a driver to steer the wheels (front right and left wheels FR, FL herein). The steering wheel 3 is fixed to one end of steering shaft 4. The steering shaft 4 is arranged to rotate with rotation of the steering wheel 3.

A rack bar 6 is coupled through a steering gear box 5 to the other end of steering shaft 4. The steering gear box 5 has a function of transforming a rotational motion of steering shaft 4 into a translational motion of the rack bar 6 in the axial direction. The both ends of the rack bar 6 are coupled to their respective hub carriers of the wheels FL, FR through knuckle arm 7. As constructed in this configuration, the wheels FL, FR are turned through steering shaft 4 and steering gear box 5 (rack bar 6) with rotation of the steering wheel 3.

Figure 2:
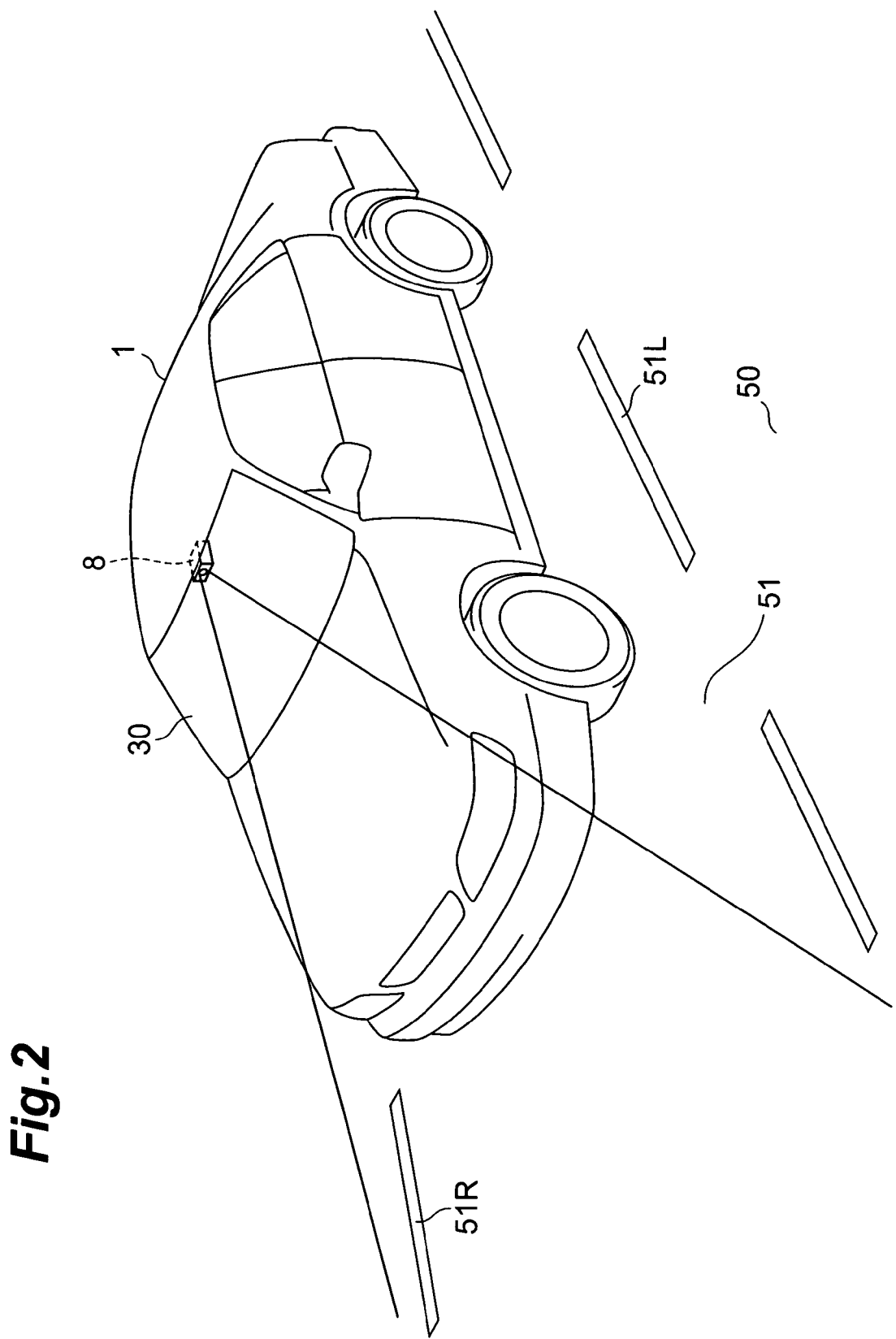
FIG. 2 is an illustration to illustrate an acquisition situation of a driving lane with a CCD camera in the embodiment of the present invention.

A CCD camera 8 for taking a forward image is built in a room mirror (cf. FIG. 2). The CCD camera 8 takes an image of surrounding circumstances in a predetermined region in front of the vehicle 1, through windshield 30. Specifically, the CCD camera 8 takes a moving images of the circumstances around driving lane 51 on which the vehicle 1 is running on road 50. An image processor 9 is connected to this CCD camera 8. The image data of the surrounding circumstances taken by the CCD camera 8 is supplied to the image processor 9. The image processor 9 performs image processing of the image data taken by the CCD camera 8, to detect a driving lane on the basis of road boundary-lines drawn on the road on which the vehicle 1 is running. In the taken image or video, the difference is large in luminance between the road surface and the boundary-lines thereon, and thus the boundary-lines to define the driving lane are relatively easily detected by edge detection or the like, which is convenient in detecting the lane in front of the vehicle.

Figure 3:
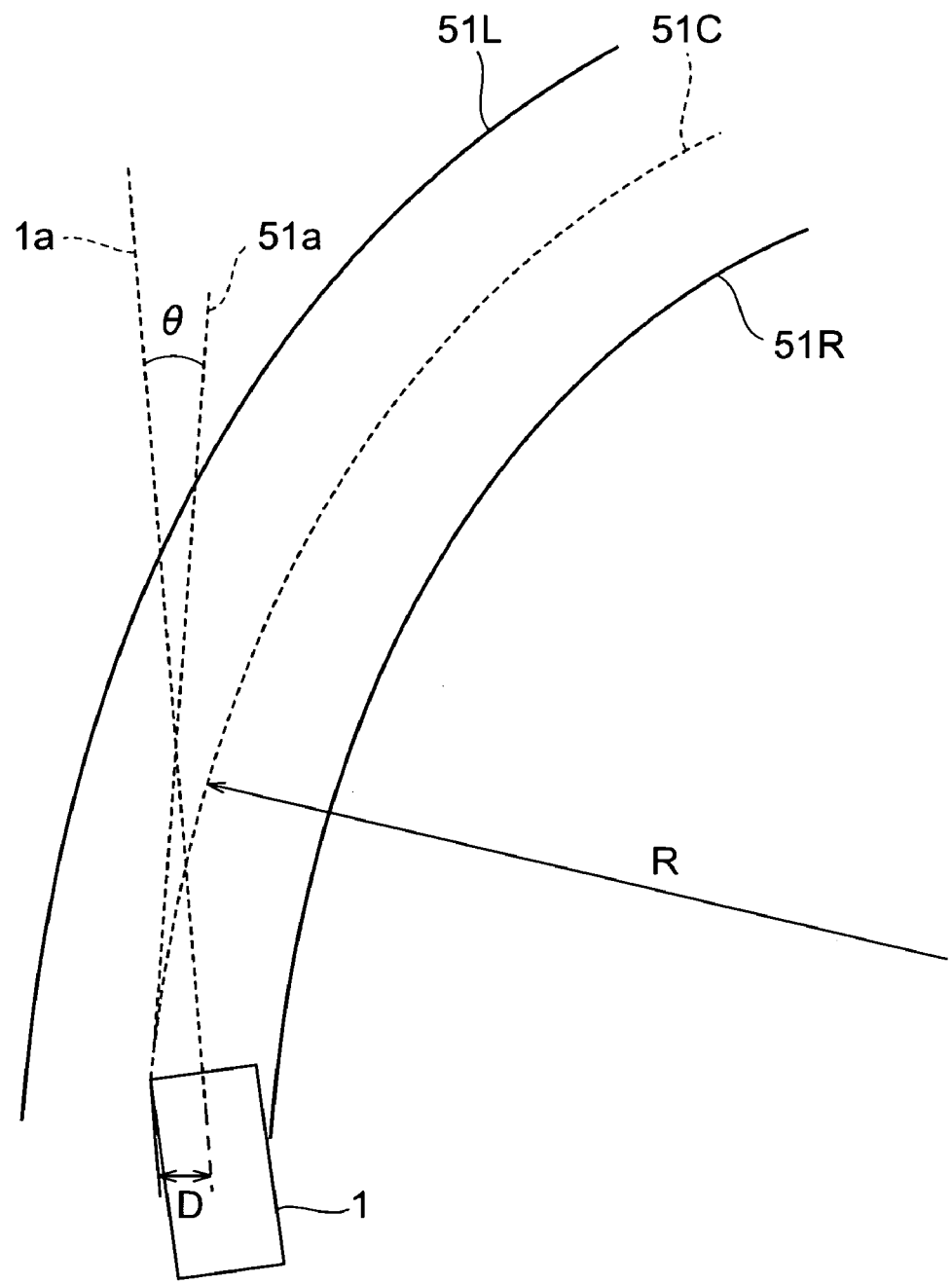
FIG. 3 is an illustration to illustrate road parameters.

The image processor 9 is connected to the aforementioned ECU 2. Based on the detected lane, as shown in FIG. 3, the image processor 9 performs arithmetic processing to detect a curve curvature of the forward travel path ($\chi=1/R$), an offset D of the vehicle 1 relative to the lane (which is equivalent to a lateral deviation amount between a center axis 1a in the longitudinal direction of the vehicle and a tangent 51a at the position of the center of gravity of the vehicle to the center line of the driving lane 51), and a yaw angle θ (which is equivalent to an angle between the center axis 1a in the longitudinal direction of the vehicle and the tangent 51a at the position of the center of gravity of the vehicle to the center line of the driving lane 51), and supplies the detection results to the ECU 2. Each of the curve curvature $\chi$, offset D, and yaw angle θ can take positive and negative values, and their signs indicate directions or orientations. Methods of detecting the various information amounts of the forward course (the curve curvature $\chi$, and the offset D and yaw angle θ of the host vehicle) on the basis of the image can be any known methods.

A steering wheel angle sensor 10 and a vehicle speed sensor 11 are also connected to the ECU 2. The steering wheel angle sensor 10 outputs a signal according to a steering wheel angle of the steering wheel 3. The vehicle speed sensor 11 consists of wheel speed sensors attached to the respective wheels, each of which generates a pulse signal in a period according to the speed of vehicle 1. The vehicle speed sensor 11 functions as vehicle speed detecting means. It is also possible to mount a sensor for detecting the longitudinal acceleration of the vehicle as vehicle speed detecting means and to acquire the vehicle speed by integrating the output from the sensor over time. The output signal from the steering wheel angle sensor 10 and the output signal from the vehicle speed sensor 11 are supplied each to the ECU 2. The ECU 2 detects the steering wheel angle based on the output signal from the steering wheel angle sensor 10 and detects the vehicle speed based on the output signal from the vehicle speed sensor 11.

A yaw rate sensor 12 and a navigation system 13 are also connected to the ECU 2. The yaw rate sensor 12 is located near the center of gravity of the vehicle 1 and is arranged to detect the yaw rate about the vertical axis at the center of gravity and feed the detection result to the ECU 2. The navigation system 13 is a device for detecting the position of the vehicle 1 by use of GPS or the like. The navigation system 13 also has a function of detecting circumstances such as the curve curvature $\chi$ and the slope in front of the vehicle 1. The ECU 2 determines the position of the vehicle 1 and a situation of a road expected to run, through the use of the navigation system 13.

Furthermore, a motor driver 14 is also connected to the ECU 2. A motor (actuator) 15 provided in the aforementioned steering gear box 5 is connected to the motor driver 14. Although not shown, a ball screw groove is formed in a part of the outer periphery of the rack bar 6, and a ball nut having a ball screw groove corresponding to the ball screw groove of the rack bar, on the inner periphery is fixed to a rotor of the motor 15. A plurality of bearing balls are housed between the pair of ball screw grooves, and actuation of the motor 15 results in rotating the rotor to assist axial movement of the rack bar 6, i.e., steering.

The motor driver 14 supplies a drive current to the motor 15 in accordance with a command signal from the ECU 2. The motor 15 applies a steering torque according to the drive current supplied from the motor driver 14, to the rack bar 6. The ECU 2 supplies a command signal to the motor driver 14 in accordance with a logic described later, to actuate the motor 15 to displace the rack bar 6, thereby turning the wheels FL, FR.

In addition, a warning lamp 16 and a warning buzzer 17 are connected to the ECU 2. The warning lamp 16 is located at a position where a driver can visually recognize it, and lights up in accordance with a command signal from the ECU 2. The warning buzzer 17 produces a sound into the vehicle interior in accordance with a command signal from the ECU 2. The ECU 2 activates the warning lamp 16 and the warning buzzer 17 in accordance with a logic described later, to draw driver's attention.

Figure 4:
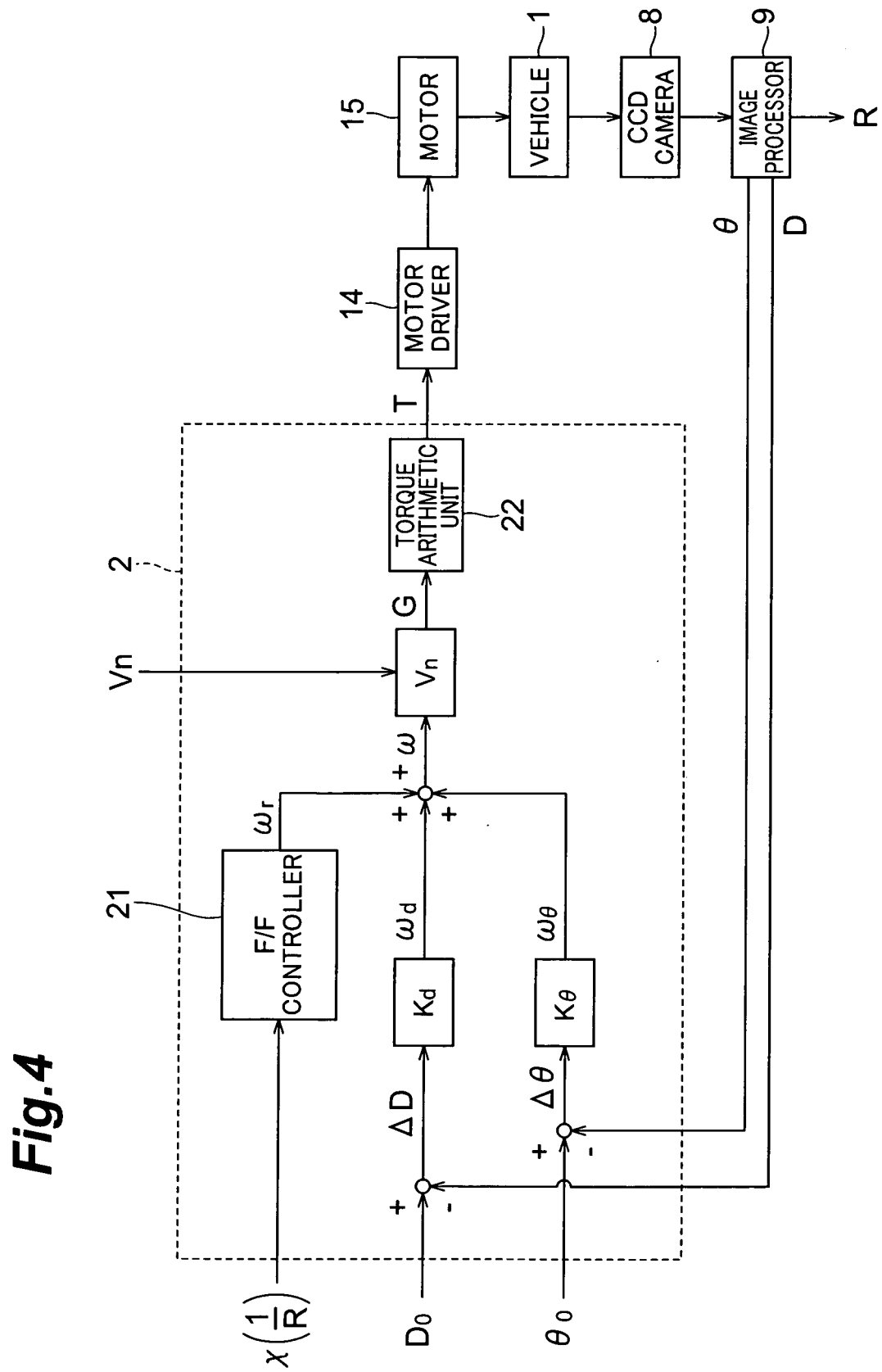
FIG. 4 is a block diagram showing an operation of steering assist control.

Next, the steering assist control will be specifically described. FIG. 4 is a block diagram showing the operation of the steering assist control.

First, the CCD camera 8 takes an image of a forward situation ahead vehicle 1 (on the right down side in FIG. 4) and, based on the image taken, the image processor 9 calculates a situation (curve curvature $\chi$) of the driving lane 51, and the offset D and yaw angle $\theta$ of the host vehicle 1. The curve curvature $\chi$ is determined by geometrically obtaining the curvature radius R of a forward curve from the taken image and calculating the inverse thereof. How to geometrically obtain the curvature radius R is to determine it with reference to an amount of lateral displacement of a boundary-line at a predetermined distance ahead the host vehicle 1, or a slope of a tangent to a boundary-line at a predetermined distance ahead the host vehicle 1.

An offset and a yaw angle as targets for the course are preliminarily determined as a target offset D0 and a target yaw angle $\theta$0.

For calculating a controlled variable to the motor driver 14, it is necessary to calculate the yaw rate $\omega$ as the controlled variable. This yaw rate $\omega$ is obtained as a total of a yaw rate $\omega r$ based on the curve curvature $\chi$, a yaw rate $\omega d$ for compensating for the offset D, and a yaw rate $\omega \theta$ for compensating for the yaw angle $\theta$.

First, the yaw rate $\omega r$ necessary for keeping the vehicle 1 running along the curve is determined based on the curve curvature $\chi(=1/R)$ ahead the vehicle 1. The curve curvature $\chi(=1/R)$ is supplied into a feed forward controller (F/F controller) 21 and the feed forward controller 21 calculates the yaw rate $\omega r$ associated with the curve curvature $\chi$ according to a predetermined characteristic.

The yaw rate $\omega d$ necessary for compensating for the offset D (for converging it to the target value) is calculated by multiplying a difference (D0−D) between the offset D and the target offset D0 by a coefficient Kd.

The yaw rate $\omega \theta$ necessary for compensating for the yaw angle $\theta$ (for converging it to the target) is calculated by multiplying a difference ($\theta$0−$\theta$) between the yaw angle $\theta$ and the target yaw angle $\theta$0 by a coefficient K$\theta$.

The target yaw rate $\omega$ is calculated by summing up the three yaw rates calculated in this manner. This target yaw rate $\omega$ is transformed into a target lateral acceleration G, using the vehicle speed Vn detected by the vehicle speed sensor 11, and a torque computing unit 22 calculates a steering quantity or a drive torque T of motor 15 necessary for generating the target lateral acceleration G.

It is noted here that not all the driving force of the motor 15 is used for steering of the wheels FL, FR, because of friction between interlocking mechanisms in the steering gear box 5 constituting the steering system, and the friction of the rack bar 6, the knuckle arms 7, and so on. For this reason, it is necessary in practice to apply a force necessary for turning the wheels FL, FR and an extra drive force compatible with the steering friction. Since this steering friction acts as a reaction force against steering, a steering force equal to (force necessary for steering+steering friction) is needed for increase of the steer angle, whereas a steering force equal to (force necessary for steering−steering friction) is enough for decrease of the steer angle.

Therefore, the torque computing unit 22 does not adopt one-to-one correspondence between lateral acceleration G and drive torque T, but calculates the drive torque T according to a tendency of increase or decrease to adjust the steering force relative to the increase/decrease tendency of the steer angle.

Figure 5:
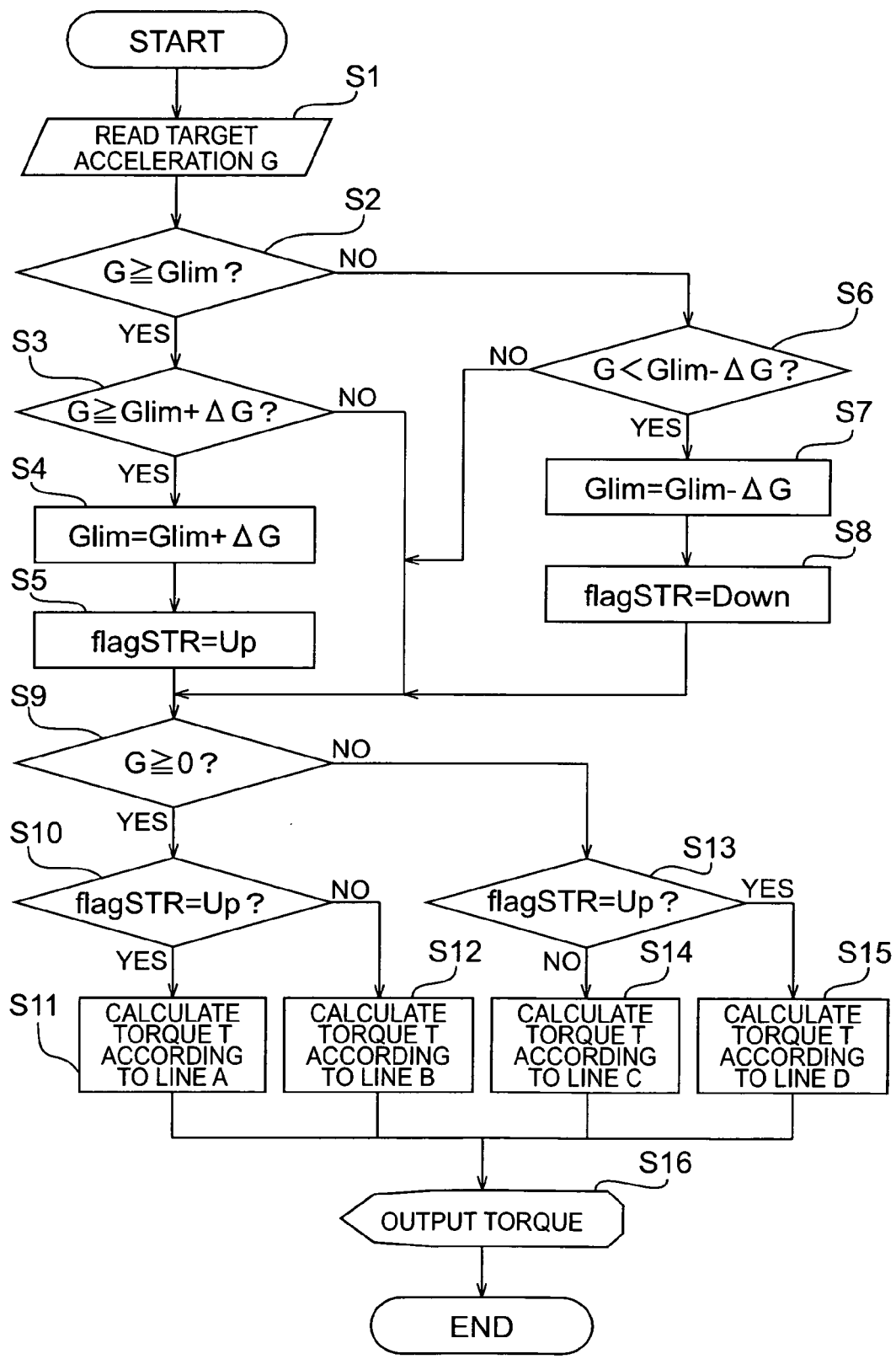
FIG. 5 is a flowchart of a steering assist torque calculating process.
Figure 6:
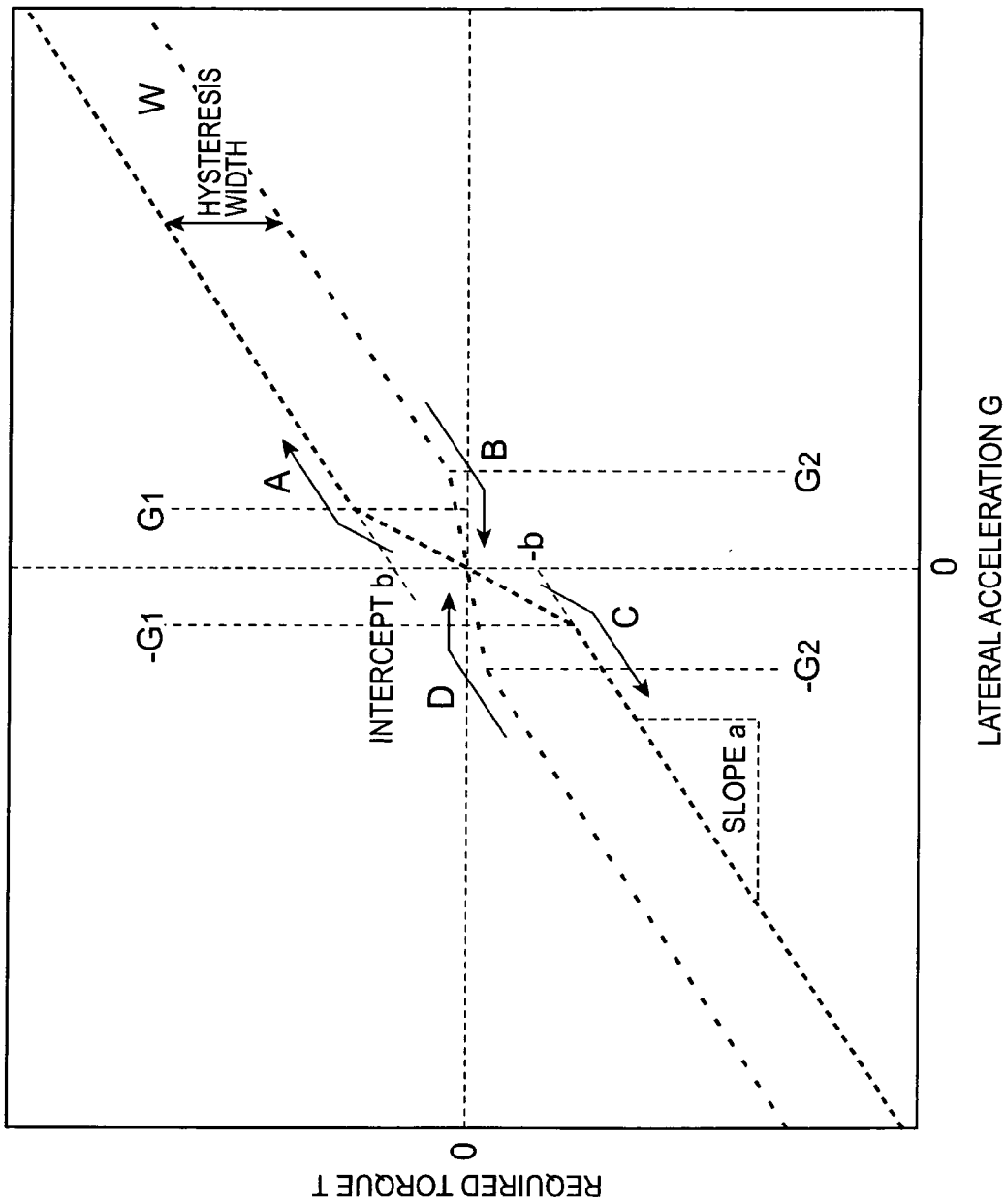
FIG. 6 is a diagram of drive torque T against target lateral acceleration G.

FIG. 5 is a flowchart of a process of calculating the steering assist torque, and FIG. 6 is a diagram of drive torque T against target lateral acceleration G. This torque calculation process is repeatedly executed at predetermined timing (time steps) by the torque computing unit 22.

First, the target lateral acceleration G is inputted and read (step S1). Next, G is compared with a threshold Glim (step S2). The initial value of this Glim is set at 0, and it varies stepwise according to change of G as described below.

When G is determined to be not less than Glim, G is further compared with (Glim+$\Delta$G) (step S3). Here $\Delta$G is a predetermined constant. When G is not less than (Glim+$\Delta$G), Glim is replaced by (Glim+$\Delta$G) (step S4), and a value Up indicating an increase tendency is put in a flag flagSTR to indicate the increase/decrease direction of target G (step S5), followed by a shift to step S9. On the other hand, when G is smaller than (Glim+$\Delta$G), the flow directly moves from step S3 to step S9. In this case, Glim and flagSTR are maintained at values at the preceding time step.

When it is determined at step S2 that G is less than Glim, G is further compared with (Glim−$\Delta$G) (step S6). When G is less than (Glim−$\Delta$G), Glim is replaced by (Glim−$\Delta$G) (step S7), and a value Down indicating a decrease tendency is put in the flag flagSTR to indicate the increase/decrease direction of target G (step S8), followed by a shift to step S9. On the other hand, when G is not less than (Glim−$\Delta$G), the flow directly moves from step S6 to step S9. In this case, Glim and flagSTR are maintained at values at the preceding time step.

Figure 7:
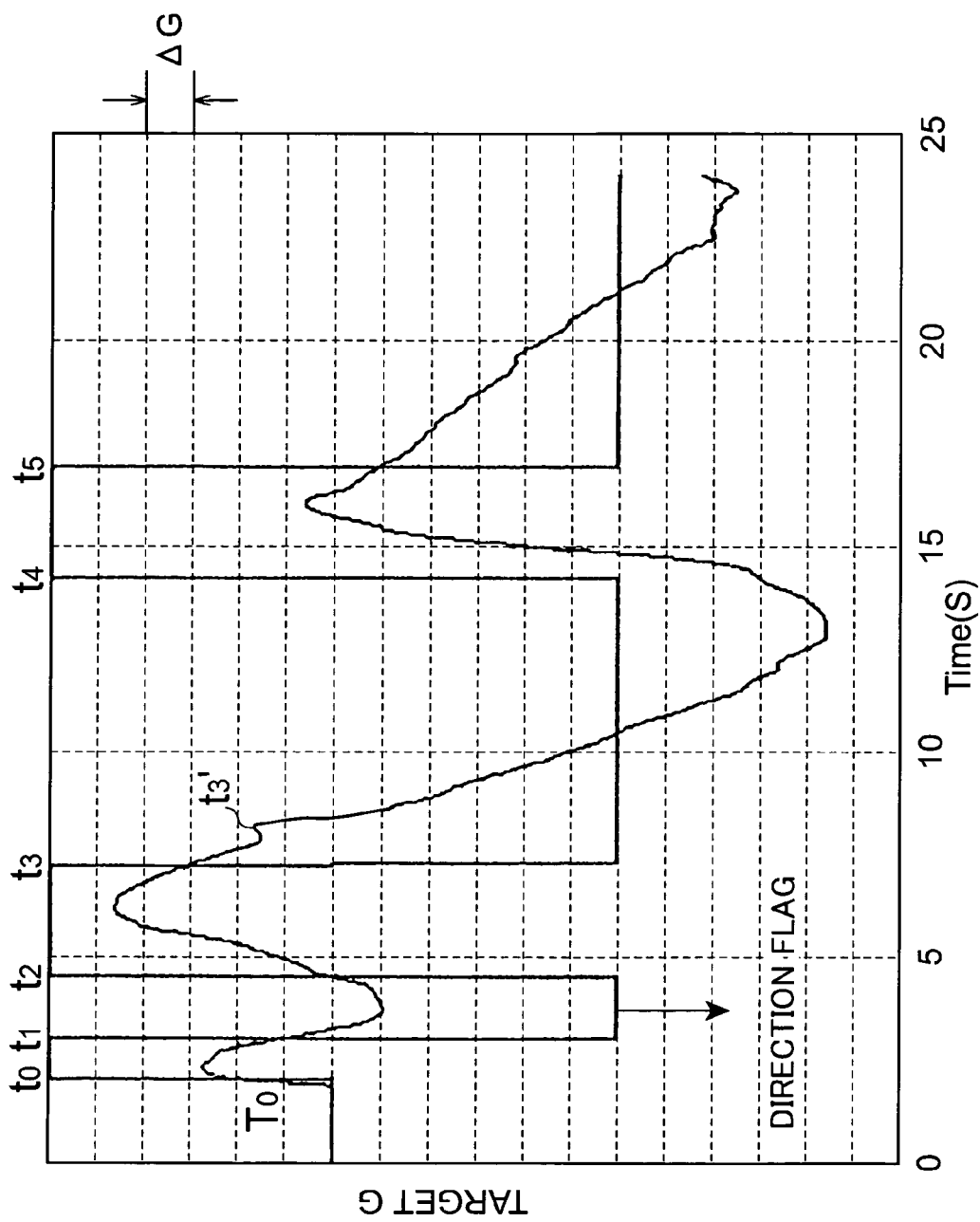
FIG. 7 is a graph to explain a process of determining an increase/decrease direction at steps S2-S8 in FIG. 5.

FIG. 7 is a graph for explaining the process of determining the increase/decrease direction at steps S2 to S8. The target lateral acceleration G sometimes includes a vibration component due to such factors as errors of measurement accuracy of the shape parameter of the road, the offset indicating the position of the vehicle, the yaw angle, and so on. For this reason, if the determination on switching of the increase/decrease direction is made based on only the change amount between the target lateral acceleration G at the preceding time step and the target lateral acceleration G at the current time step, the switching will frequently occur to change the applied steering assist torque in a vibrating manner, so as to possibly degrade controllability.

In the processes of steps S2 to S8, therefore, it is determined that the increase tendency is continuing, at a point of time when the difference between the set threshold Glim and target G reaches ΔG (points of t0, t2, and t4 in FIG. 7), Glim is increased by ΔG, and the value Up indicating the increase tendency is stored in flagSTR. Conversely, it is determined that the decrease tendency is continuing, at a point of time when the difference between the set threshold Glim and target G reaches −ΔG (points of t1, t3, and t5 in FIG. 7), Glim is decreased by ΔG, and the value Down indicating the decrease tendency is stored in flagSTR. When the increase/decrease direction is temporarily inverted within the range of ΔG, as at a point of t3' in FIG. 7, it is not determined that the increase tendency or the decrease tendency has changed, because of no variation in Glim. Therefore, no switch is made upon temporary change of the increase/decrease direction due to noise or fine adjustment, so as to suppress frequent switching of direction. For this reason, the assist torque value is prevented from largely varying, whereby degradation of controllability can be suppressed.

In this manner, a switch of the increase/decrease direction is first permitted when a tendency of increase or decrease continues after a switch from increase to decrease or a switch from decrease to increase; this suppresses occurrence of vibrating change. It is a matter of course that a switch of the increase/decrease direction can be made when the increase/decrease tendency continues over a predetermined time (a predetermined number of time steps) after arrival at a maximum.

It is determined at step S9 whether the target lateral acceleration G is positive or negative. When the target lateral acceleration G is determined to be not less than 0, the flow moves to step S10 to determine what is the value of flagSTR determined above. When flagSTR is Up, i.e., when the target lateral acceleration G is determined to be in the increase tendency, the flow moves to step S11 to calculate the steering assist torque T on the basis of a line A in FIG. 6, and the determined torque T is outputted to complete the processing (step S16).

On the other hand, when it is determined at step S10 that flagSTR is Down, i.e., when the target lateral acceleration G is determined to be in the decrease tendency, the flow moves to step S12 to calculate the steering assist torque T on the basis of a line B in FIG. 6, and the determined torque T is outputted to complete the processing (step S16).

When it is determined at step S9 that the target lateral acceleration G is negative, the flow moves to step S13 to determine what is the value of flagSTR determined above. When flagSTR is Up, i.e., when the target lateral acceleration G is determined to be in the increase tendency, the flow moves to step S15 to calculate the steering assist torque T on the basis of a line D in FIG. 6, and the determined torque T is outputted to complete the processing (step S16).

On the other hand, when it is determined at step S13 that flagSTR is Down, i.e., when the target lateral acceleration G is determined to be in the decrease tendency, the flow moves to step S14 to calculate the steering assist torque T on the basis of a line C in FIG. 6, and the determined torque T is outputted to complete the processing (step S16).

The lines A to D shown in FIG. 6 are set, for example, as follows.

$$\begin{cases} G \geq 0 \begin{cases} A & T = aG + b & G \geq G_1 \\ & T = \left(a + \dfrac{b}{G_1}\right)G & G < G_1 \\ B & T = aG + (b-w) & G \geq G_2 \\ & T = \dfrac{aG_2 + (b-w)}{G_2}G & G < G_2 \end{cases} \\ G < 0 \begin{cases} C & T = aG - b & G \leq -G_1 \\ & T = \left(a + \dfrac{b}{G_1}\right)G & G > -G_1 \\ D & T = aG - (b-w) & G \leq -G_2 \\ & T = \dfrac{aG_2 + (b-w)}{G_2}G & G > -G_2 \end{cases} \end{cases}$$

Herein, coefficients a, b, and w are preliminarily set according to vehicle characteristics. These can be determined from the characteristics obtained by measuring the lateral acceleration against required torque on an actual vehicle. The coefficient a is an increase amount of the required torque against an increased amount of the lateral acceleration and corresponds to a slope in FIG. 6. The coefficient b is a value of the required torque to initiate the appearance of lateral acceleration. In FIG. 6, the coefficient b corresponds to an intercept b. The coefficient w is expressed as a hysteresis width in FIG. 6, and it is obtained as a difference between the required torque achieved in practice in the increase tendency of the lateral acceleration and in the decrease tendency thereof.

According to the drive torque T determined in this manner, the ECU 2 instructs the motor driver 14 to drive the motor 15. This results in turning the front right and left wheels FR, FL, whereby the vehicle 1 turns so as to maintain the lane. As the vehicle 1 turns, the CCD camera 8 again takes the image of the forward situation, followed by repetitions of the processing described above.

In this manner, the required torque for the motor 15 is varied depending upon the increase/decrease and direction of the target lateral acceleration Q whereby the torque given by the motor 15 is varied according to the steering friction between in the forward steering operation (corresponding to line A and line C in FIG. 6) and in the backward steering operation (corresponding to line B and line D in FIG. 6); as a result, it becomes feasible to match the lateral acceleration G achieved, with the target value as much as possible. This permits execution of stable control, so as to improve controllability.

Since the required torque is also set to be 0 at the target lateral acceleration of 0, the shift into the neutral state of steering can be made with certainty, and this can suppress occurrence of the situation in which the torque varies in a vibrating manner near the neutral state. This also improves the driver's steering feeling.

Figure 8:
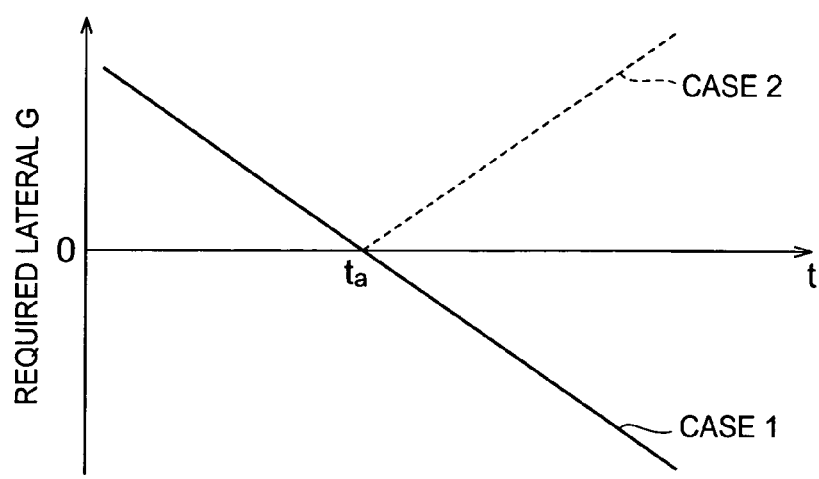
FIG. 8(a) is a diagram showing a change of the target lateral acceleration, FIG. 8(b) a diagram showing a change of required torque where the hysteresis width w is constant, and FIG. 8(c) a diagram showing a change of required torque according to the present invention.
Figure 8:
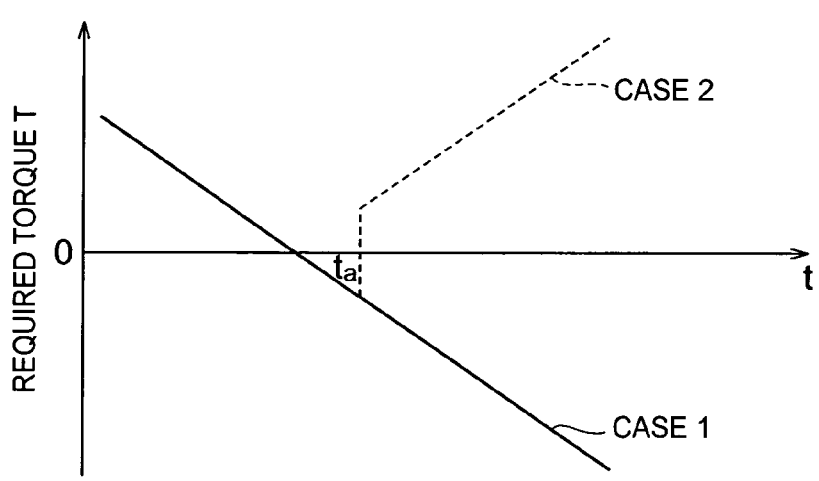
Figure 8:
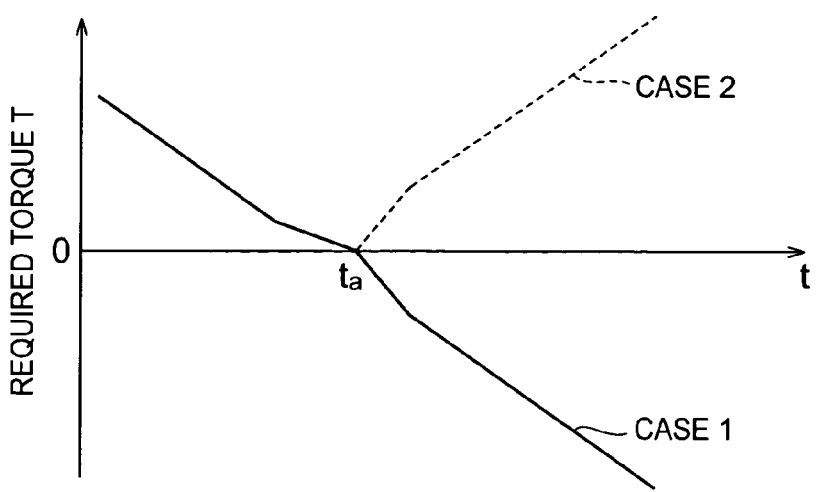

FIG. 8 shows examples of time change of required lateral acceleration G and required torque T near the neutral state of steering. As shown in FIG. 8(a), let us consider case 1 (indicated by a solid line) in which the required lateral acceleration G monotonically decreases, and case 2 in which the required lateral acceleration G monotonically decreases up to 0 at time ta and thereafter again monotonically increases. Case 1 is a case where a shift is made from a right turn to a left turn, and case 2 a case where steering is returned from a right turn to the neutral and thereafter again to a right turn.

If the required torque T at a certain lateral acceleration in the increase of the lateral acceleration G is simply made different by the hysteresis width w from the required torque T at the same lateral acceleration in the decrease of the lateral acceleration G, as shown in FIG. 8(b), the required torque T monotonically decreases in case 1, but in case 2 the required torque needs to be suddenly increased by the hysteresis width w at time ta. Since this variation of assist torque occurs near the neutral state of steering, the driver will feel uncomfortable, so as to result in degradation of the steering feeling.

In contrast to it, the present embodiment is free of occurrence of the jump of torque as shown in FIG. 8(b), because the required torque T continuously varies in terms of time in both of case 1 and case 2, as shown in FIG. 8(c). For this reason, the torque variation becomes natural in the both cases, whereby the driver will never feel uncomfortable, so as to suppress the degradation of the steering feeling. Since such switching of the steering direction near the neutral can frequently occur in the lane keep control, it is significant.

Figure 9:
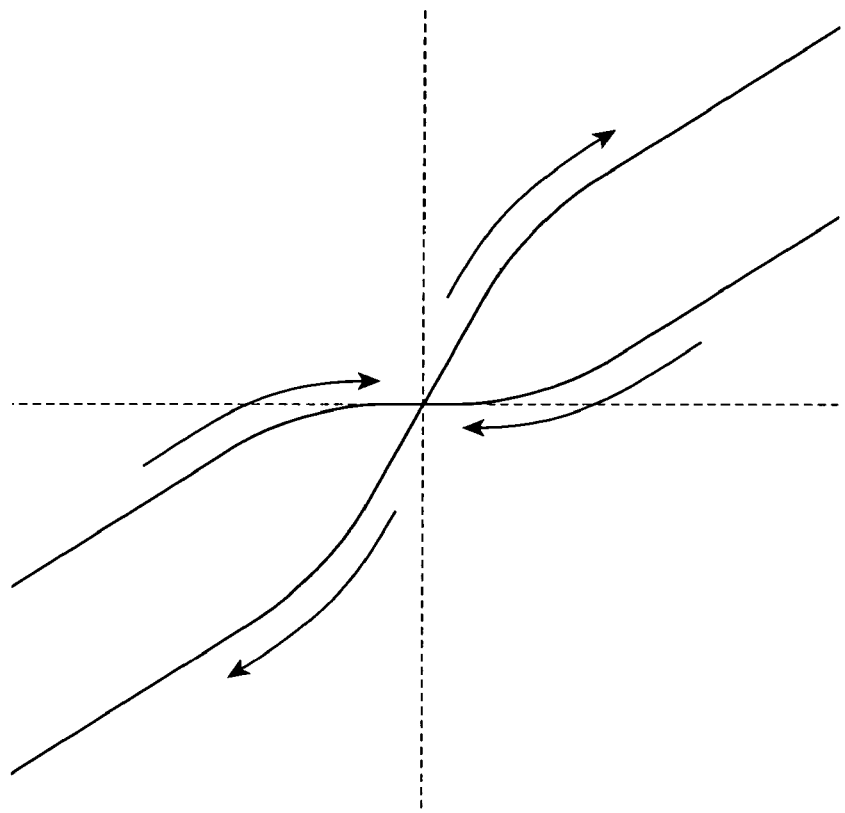
FIG. 9 is a diagram showing a part near the neutral state of steering in a characteristic diagram showing another example of torque-lateral acceleration.
Figure 10:
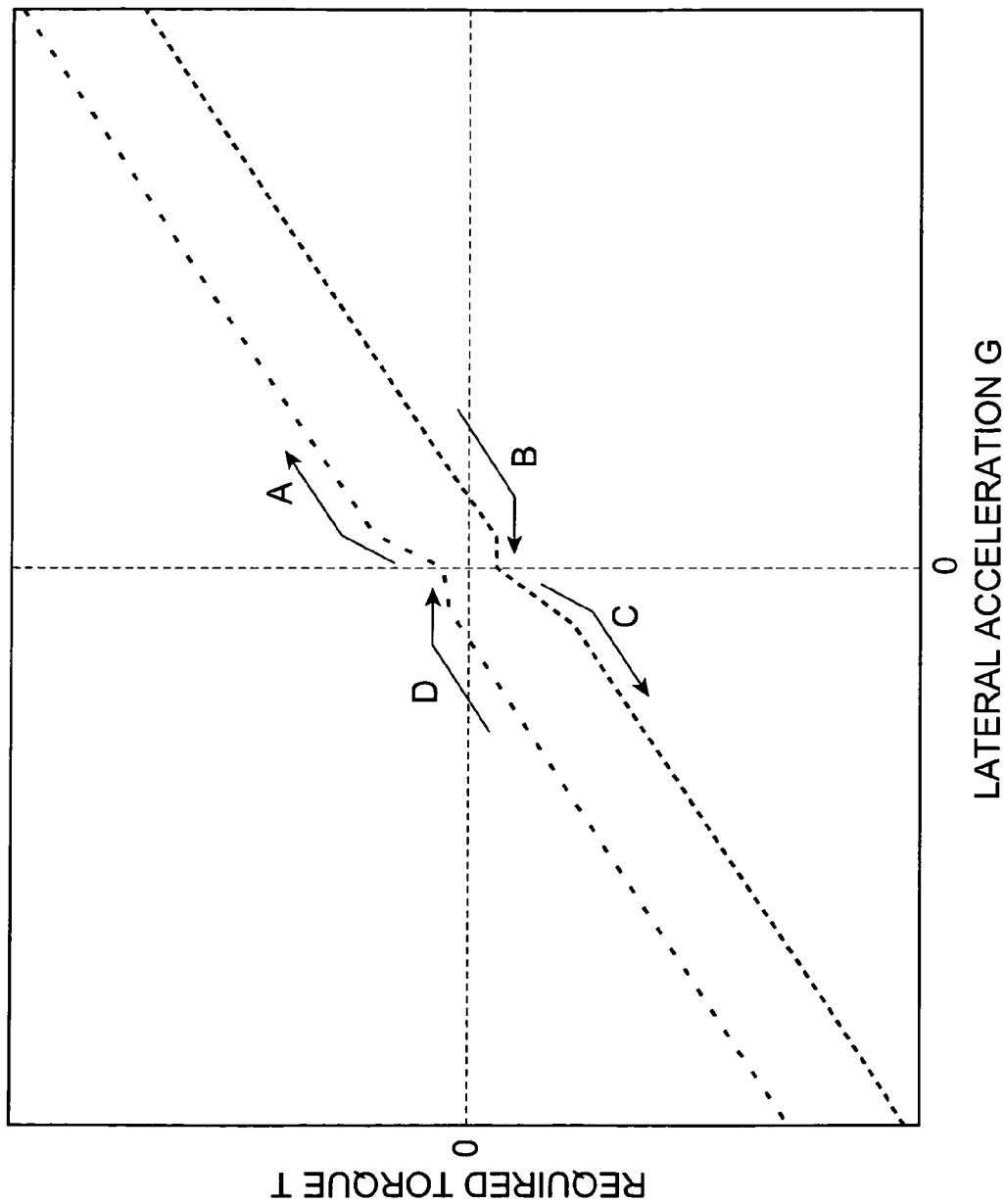
FIG. 10 is a diagram showing a part near the neutral state of steering in a characteristic diagram showing still another example of torque-lateral acceleration.

The characteristic diagram of torque-lateral acceleration near the neutral of steering does not have to be limited to the example described above. For example, as shown in FIG. 9, a curve may be used to connect the straight regions where the absolute value of the target lateral acceleration G is large. In still another example, as shown in FIG. 10, the hysteresis width in the neutral state of steering (the difference between the assist torque in increase of the lateral acceleration and the assist torque in decrease of the lateral acceleration) may be set at a predetermined value, instead of 0. By making the hysteresis width near the neutral of steering smaller than that in the other regions, it is feasible to implement the steering assist without uncomfortableness in the neutral state of steering.

The above described the example of application of the present invention to the steering assist apparatus for supporting driving along the driving lane, and it is noted that the present invention is also suitably applicable to automatic steering apparatus and the like for calculating the target lateral acceleration and performing steering based thereon.

What is claimed is:

1. A steering assist apparatus for a vehicle, comprising a controller that:
   receives input from a sensor; and
   controls a motor based on input from the sensor;
      wherein the motor applies an assist torque;
      wherein the assist torque at any given target lateral acceleration, the any given target lateral acceleration being less than or greater than 0, is so set that the assist torque in an increasing state of the target lateral acceleration is larger than the assist torque in a decreasing state of the target lateral acceleration, and
      wherein in a region near a target lateral acceleration of 0, a difference at any given target lateral acceleration between the assist torque applied in the increasing state of the target lateral acceleration and the assist torque applied in the decreasing state of the target lateral acceleration becomes smaller as the any given target lateral acceleration approaches 0.

2. The steering assist apparatus according to claim 1, wherein at the target lateral acceleration of 0, the difference between the assist torque applied in the increasing state of the target lateral acceleration and the assist torque applied in the decreasing state of the target lateral acceleration is set to 0.

3. The steering assist apparatus according to claim 1, wherein on the basis of a transition of time change of the target lateral acceleration, it is determined that a switch of an increase/decrease direction of the target lateral acceleration was made, if either an increase tendency of the target lateral acceleration further continues after a switch from a decrease tendency to an increase tendency for a predetermined period of time, or a decrease tendency of the target lateral acceleration further continues after a switch from an increase tendency to a decrease tendency for a predetermined period of time.

4. The steering assist apparatus according to claim 1, wherein the motor is an electric motor.

5. The steering assist apparatus according to claim 1, further comprising:
   means for recognizing a future course of the vehicle and a driving lane, and
   means for calculating a lateral acceleration necessary for keeping the vehicle running on the driving lane,
      wherein the steering assist is performed according to the lateral acceleration calculated.

6. A steering assist method for a vehicle comprising:
   determining a target lateral acceleration for a steering assist operation, and
   applying an assist steering force for assisting a driver's steering force in response to the target lateral acceleration,
      wherein the assist torque at any given target lateral acceleration, the any given target lateral acceleration being less than or greater than 0, is so set that the assist torque in an increasing state of the target lateral acceleration is larger than the assist torque in a decreasing state of the target lateral acceleration, and
      wherein in a region near a target lateral acceleration of 0, a difference at any given target lateral acceleration between the assist torque applied in the increasing state of the target lateral acceleration and the assist torque applied in the decreasing state of the target lateral acceleration becomes smaller as the any given target lateral acceleration approaches 0.

7. The steering assist method according to claim 6, wherein at the target lateral acceleration of 0, the difference between the assist torque applied in the increasing state of the target lateral acceleration and the assist torque applied in the decreasing state of the target lateral acceleration is set to 0.

8. The steering assist method according to claim 6, wherein on the basis of a transition of time change of the target lateral acceleration, it is determined that a switch of an increase/decrease direction of the target lateral acceleration was made, if either an increase tendency of the target lateral acceleration further continues after a switch from a decrease tendency to an increase tendency for a predetermined time, or a decrease tendency of the target lateral acceleration further continues after a switch from an increase tendency to a decrease tendency for a predetermined period of time.

9. The steering assist method according to claim 6, further comprising:
   recognizing a future course of the vehicle and a driving lane, and
   calculating a lateral acceleration necessary for keeping the vehicle traveling on the driving lane,
      wherein the steering assist is performed according to the lateral acceleration calculated.

* * * * *